US005786967A

United States Patent [19]
Gerfast et al.

[11] Patent Number: 5,786,967
[45] Date of Patent: Jul. 28, 1998

[54] TAPE CARTRIDGE INCLUDING AN INDICATION DEVICE TO DISTINGUISH BETWEEN CARTRIDGES HAVING DIFFERENT CHARACTERISTICS BUT NEARLY IDENTICAL PHYSICAL CHARACTERISTICS

[75] Inventors: Sten R. Gerfast, Mendota Heights; Eugene S. Johnson, Burnsville; Eddie T. Morioka, Roseville; Theodore A. Schwarz, Woodbury; Robert W. Tapani, Oakdale, all of Minn.

[73] Assignee: Imation Corp., Oakdale, Minn.

[21] Appl. No.: 161,978

[22] Filed: Dec. 3, 1993

Related U.S. Application Data

[63] Continuation of Ser. No. 945,599, Sep. 16, 1992, abandoned, which is a continuation of Ser. No. 732,729, Jul. 18, 1991, abandoned, which is a continuation of Ser. No. 464,290, Jan. 12, 1990, abandoned, which is a continuation-in-part of Ser. No. 322,617, Mar. 13, 1989, abandoned.

[51] Int. Cl.⁶ .................................................. G11B 23/02
[52] U.S. Cl. ........................ 360/132; 242/344; 242/347; 360/60
[58] Field of Search ........................ 360/132, 60, 69; 242/197, 159, 344, 347

[56] References Cited

U.S. PATENT DOCUMENTS

| | | | |
|---|---|---|---|
| 3,839,736 | 10/1974 | Hoshall | 360/132 |
| 3,900,889 | 8/1975 | Broghammer | 360/69 |
| 3,940,799 | 2/1976 | Matsumoto et al. | 360/60 X |
| 4,012,011 | 3/1977 | Saito | 242/199 |
| 4,221,348 | 9/1980 | Moeller | 242/192 |
| 4,460,930 | 7/1984 | Takahashi | 360/60 |
| 4,549,240 | 10/1985 | Hodges | 360/133 |
| 4,722,015 | 1/1988 | Ushiro | 360/128 |
| 4,769,732 | 9/1988 | Tanaka | 360/132 |

FOREIGN PATENT DOCUMENTS

| | | | |
|---|---|---|---|
| 0 040 686 | 12/1981 | European Pat. Off. | G11B 23/04 |
| 0 091 171 | 10/1983 | European Pat. Off. | G11B 23/04 |
| 0 249 482 | 12/1987 | European Pat. Off. | G11B 15/02 |
| 29 01 575 | 1/1979 | Germany | G11B 15/02 |

OTHER PUBLICATIONS

Proposed American National Standard Unrecorded Magnetic Tape Mini-Cartridge for Information Interchange (X3B5/87-218), Oct. 12, 1987.
American National Standard for Processing Information—Unrecorded Magnetic Tape Cartridge for Information Interchange (X3.55-1982), Jun. 17, 1982.

*Primary Examiner*—Andrew L. Sniezek
*Attorney, Agent, or Firm*—Eric D. Levinson

[57] ABSTRACT

Improved data protection features for a magnetic recording tape cartridge comprise a recess in the cartridge shell and a movable "file protect" device, which may be a rotatable plug or slidable member. The features enable tape drives to distinguish between two types of cartridges with otherwise identical form factors, allowing one of the cartridges to contain a recording tape with different characteristics that require the tape drive to identify the characteristics of the tape prior to use.

4 Claims, 2 Drawing Sheets

TAPE CARTRIDGE INCLUDING AN INDICATION DEVICE TO DISTINGUISH BETWEEN CARTRIDGES HAVING DIFFERENT CHARACTERISTICS BUT NEARLY IDENTICAL PHYSICAL CHARACTERISTICS

CROSS REFERENCE TO RELATED APPLICATION

This application is a continuation of application Ser. No. 07/945,599, filed Sep. 16, 1992, now abandoned, which was a continuation of application Ser. No. 07/732,729, filed Jul. 18, 1991, now abandoned, which was a continuation of application Ser. No. 07/464,290, filed Jan. 12, 1990, now abandoned, which was a continuation in part of application Ser. No. 07/322,617, filed Mar. 13, 1989, now abandoned.

TECHNICAL FIELD

This invention involves belt-driven magnetic recording tape cartridges, and particularly features incorporated into the cartridges to distinguish between cartridges having differing recording characteristics but nearly identical physical characteristics.

BACKGROUND

A popular type of magnetic data recording tape is contained within a cartridge, commonly called a "tape cartridge" or "data cartridge." The cartridge encloses the tape, which is wound on two reels or hubs driven by a friction coupled endless internal belt and capstan system in which the belt contacts the periphery of the wound tape, and other features. The minimum requirements for the physical and magnetic interchange of one magnetic tape cartridge of this type are presented in American National Standard X3.55-1982 and subsequent Standards incorporating X3.55-1982. Requirements for a similar but smaller "magnetic tape mini-cartridge" are presented in Proposed American National Standard X3B5/87-218, 3rd Draft, Oct. 12, 1987. Tape cartridges meeting these minimum physical requirements are said to have the "form factor" defined by the dimensions and configuration specified by the appropriate standard or draft standard. In this specification and the claims, the term "tape cartridge" refers to a magnetic recording tape cartridge substantially as described by either standard, and thus having substantially either form factor, unless it is specifically identified as a "full-sized tape cartridge" or a "mini-tape cartridge."

A feature of tape cartridges sensed by present tape drives is the position of a "file protect" device, which may be selectively moved to cover a recess in the cartridge shell. Only if a switch in the tape drive does not detect the file protect device will the drive write (including erase) data on the tape. The file protect device in previously used full-sized tape cartridges is a semi-cylindrical hollow rotatable plug, and in previously used mini-tape cartridges it is a slidable tab known in the Proposed American National Standard as a "slide switch."

DISCLOSURE OF INVENTION

The invention is a tape cartridge comprising a housing having a predetermined form factor, a magnetic data recording tape having a certain recording characteristic, and means for indicating: (a) that the tape is write protected from a first drive not adapted to write upon it; and (b) whether the tape is write protected (as opposed to write permitted) from a second drive which is adapted to write upon it, comprising a suitably formed portion of the housing having a member selectively positionable in one of two positions corresponding to write permitted and write protected (or prohibited) modes.

DETAILED DESCRIPTION

Figures 1, 2:
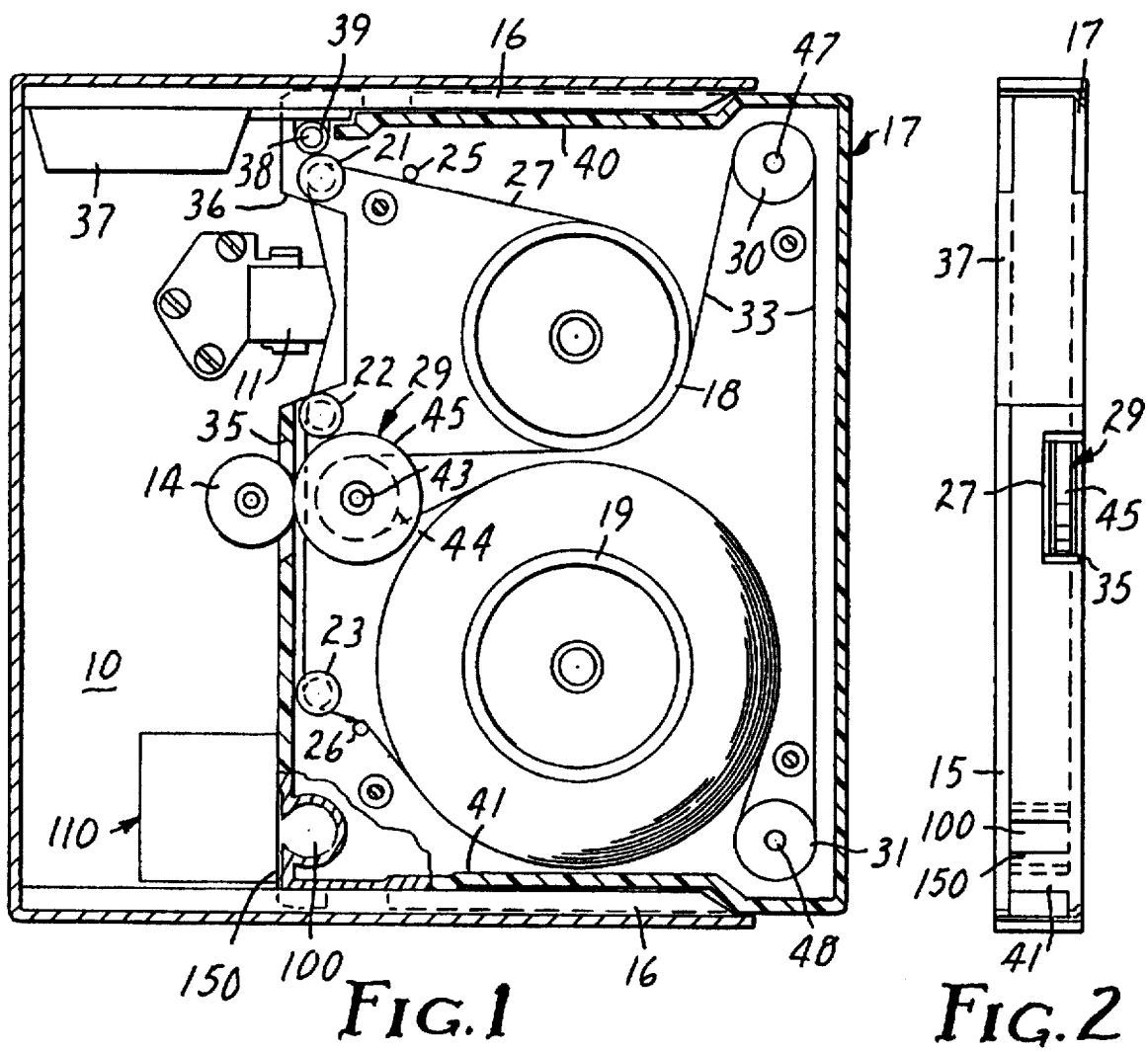
FIG. 1 is a top view, partially in section, of a tape cartridge shown in position in a tape drive.
FIG. 2 is an edge view showing the front wall of the tape cartridge of FIG. 1.
Figure 3:
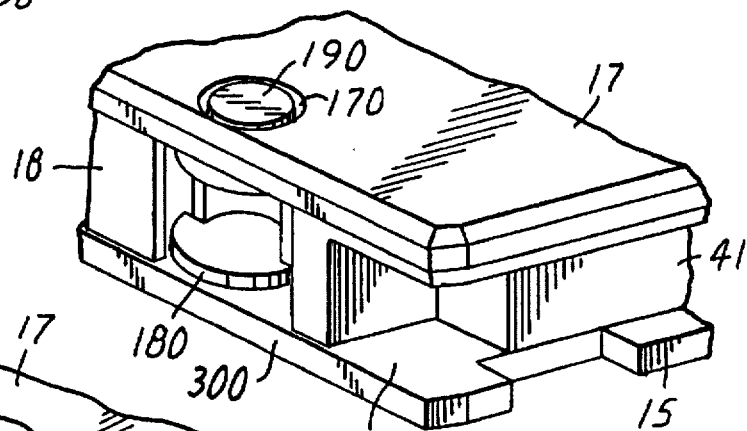
FIG. 3 is a perspective view of a portion of the tape cartridge of FIG. 1.

FIGS. 1-3 show a belt driven full-sized tape cartridge, substantially as described in American National Standard X3.55-1982, but having a different write protect scheme. In FIG. 1 the cartridge is shown in position on a tape drive (a machine for reading, writing, and erasing data to and from the tape as appropriate).

The cartridge includes a base 15 and a shell 17, together defining a thin, generally rectangular enclosure having front wall 18. Within the shell 17 are reel hubs 19 and 20, tape guides 21, 22 and 23, tape wrap pins 25 and 26, tape 27, belt driving roller 29, belt guide rollers 30 and 31, and driving belt 33.

An opening 35 in front wall 18 of shell 17 provides access for a drive roller 14, part of the tape drive, to contact belt driving roller 29. Similarly, through cutaway portion 36 in front wall 18, magnetic transducer 11 of the drive contacts magnetic tape 27. Cutaway portion 36 is normally covered by door 37, which is pivoted on stud 38 adjacent a corner of the cartridge, and biased by torsion spring 39 toward its closed position, flush with front wall 18. The opposed edge walls 40 and 41 are recessed along their lengths to expose the outermost portions of base 15. The elongate guides 16 in the drive are formed to fit over the exposed portions of base 15 to guide the cartridge as it is inserted, front wall 18 forward, into drive 10. Door 37 extends beyond its pivot stud 38 into a recessed portion of the adjacent edge wall 40 and the leading edge of the corresponding elongate guide 16 is beveled to pivot door 37 to an open position as the cartridge is inserted into the drive.

Reel hubs 19 and 20 are supported by cartridge shell 17 for free rotation about spaced parallel axes. Tape 27 is wound on reel hubs 19 and 20 in opposite directions about their axes. A tape guide path between the reel hubs is defined by the three guide pins 21, 22, and 23 and the pair of tape wrap pins 25 and 26. One tape guide pin 21 is at one side of cartridge cutaway portion 36, and the other two tape guide pins 22 and 23 are along the edge wall of the cartridge on the opposite side of cutaway portion 36. One tape wrap pin 25 is between reel hub 18 and tape guide 21, and the other tape wrap pin 26 is between reel hub 19 and tape guide 23.

Drive belt 33 is thin, continuous, flexible, elastic, and uniform in cross section. Drive belt 33 extends in a belt guide path which takes it around belt driving roller 29 and belt guide rollers 30 and 31, contacting tape 27 on reel hubs 18 and 19. The elasticity, length, pretension, and angle of wrap of drive belt 33 at the reel hubs provide the necessary contact to assure frictional driving of tape 27 and reel hubs 19 and 20 by belt 33. Rotation of belt driving roller 29 by drive roller 14 of the drive causes belt 33 and tape 27 to move.

A tape drive adapted for use with the cartridge of FIGS. 1–3 includes, generally but not necessarily within the location indicated at 110, sensors, switches, and associated circuitry for detecting that a cartridge having the correct form factor is in proper position. Sensing circuitry 110 also detects if a "file protect" feature of the tape cartridge is selectably placed in a predetermined position. If no cartridge is present, or if a cartridge is present but the file protect device is not in a certain position, sensing circuitry 110 is designed to prevent the tape drive from writing (including erasing) onto tape 27.

For example, the file protect device in previously used full-sized tape cartridges is a semi-cylindrical rotatable plug, and in present mini-tape cartridges it is a slide switch comprising a tab. Both devices operate on the same principles in drives having mechanical switches as part of their sensing circuitry. The file protect device may be positioned to expose or cover a recess in the cartridge shell. When the recess is exposed, mechanical switches of sensing circuitry 110 extend from the tape drive into the recess far enough that the switch is not made, and the drive is accordingly prevented from writing upon tape 27. In this position of the file protect device, the cartridge is said to be "write protected" from the drive.

The tape cartridge of the present invention includes a permanently open recess 100 on the front wall of cartridge shell 17, shown in FIGS. 1–3 as a recess in front wall 18. When such a tape cartridge of the present invention is used in a tape drive adapted to present full-sized tape cartridges, the sensing circuitry will interpret recess 100 as if a write protected prior art tape cartridge were present, and will not attempt to write data onto the tape of the cartridge.

Such a tape cartridge of the present invention could contain a recording tape having different recording characteristics, such that existing drives should not attempt to erase or write upon the tape. For example, many previously used drives are adapted for present tape cartridges including magnetic recording tape having a coercivity of about 550 Oersted (44,000 amperes/meter), and should not attempt to write or erase tape having 900 Oe (72,000 amperes/meter) coercivity, but they should be allowed to read the higher coercivity tape. Because the inventive cartridge permanently emulates a "write protected" non-inventive cartridge, previously used tape drives will only be allowed to read data recorded on tape 27, and such data may not be erased or written over.

Figure 4:
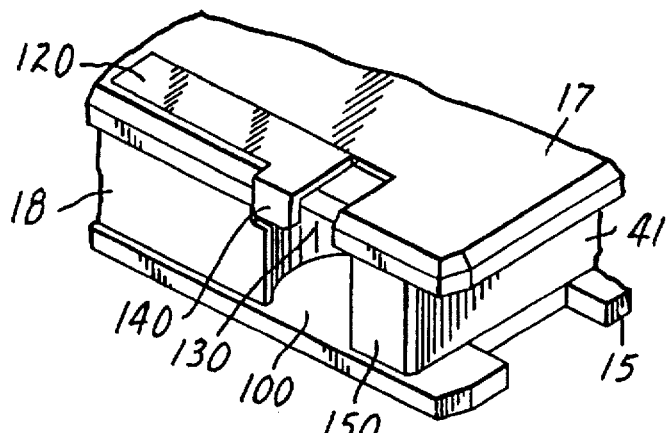
FIG. 4 is a perspective view of a portion of an embodiment of this invention.

However, such a tape cartridge of the present invention still requires some sort of file protect device to protect data recorded on the tape from erasure by tape drives which may be constructed to accommodate them. FIG. 4 shows one embodiment of a file protect device of a data cartridge of the present invention. In this embodiment, a movable slide switch 120 is located generally on the cover of cartridge shell 17, and comprises a tab 140 extending down from the top of the tape cartridge to cover a portion of recess 100 in cartridge shell 17. Tab 140 is flush with the front wall of the cartridge shell, and does not cover that portion of recess 100 that allows an inventive tape cartridge to emulate a write protected non-inventive cartridge. Instead, tab 140 selectively covers a top portion 130 of recess 100. When a first half of top portion 130 is covered, the tape may be erased or written upon. When a second half of recess 130 is covered, as shown in FIG. 4, the cartridge is "write protected" or "write prohibited" and may be read only.

The sensing circuitry for a tape drive adapted for use with the tape cartridge of the present invention includes means for detecting whether tab 140 is in either half of the upper portion 130 of recess 100. For example, two position mechanical switches contacting the tape cartridge at selected locations are used in present tape drives, and will be used in this discussion for illustrative purposes only. Taking switch "A" to detect the centermost half of portion 130, switch "B" the outermost half of portion 130, "old" and "new" as shorthand terms for "previously used" and "inventive" respectively, the switch logic for the tape drive is:

| Configuration | Switch A | Switch B | Result |
|---|---|---|---|
| No Cartridge | Off | Off | — |
| New Cartridge | Off | On | Write Prohibited |
| New Cartridge | On | Off | Write Permitted |
| Old Cartridge | On | On | Write Permitted at Manufacturer's Option |

A switch is considered "on" for this embodiment when it detects tab 140, or in the case of an old cartridge in a new drive, when it detects the edge of the non-inventive cartridge. The latter may be appreciated by comparing FIGS. 3 and 4, and noting that switches positioned to detect tab 140 will detect front edge 160 of the previously used cartridge. A switch is considered "off" for this embodiment when it detects its half of portion 130 or the lack of a tape cartridge in the drive. Detection of the type of cartridge, old or new, is required so the tape drive may adjust for any differences between the types of tape in tape cartridges of the present invention and tape of previously used cartridges, such as coercivity levels, the physical markers for beginning and end of tape, etc.

Figure 5:
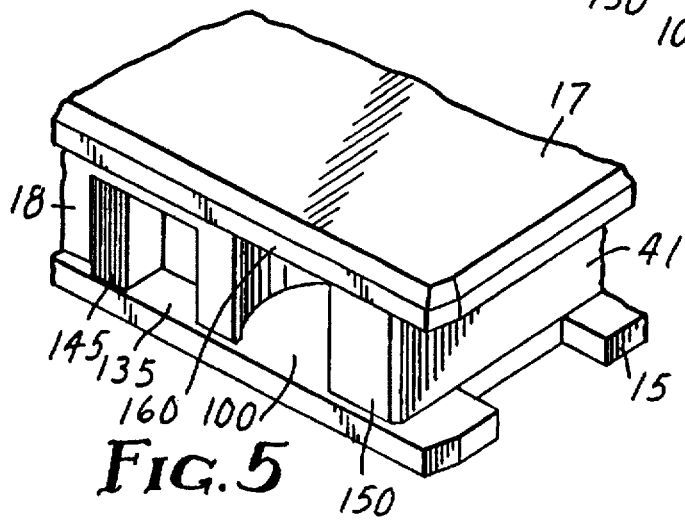
FIG. 5 is a perspective view of a portion of another embodiment of the invention.

In a variation on this embodiment, as shown in FIG. 5, the file protect device is not slide switch 120 but a knurled rectangular tab 145, located in a generally rectangular recess 135. This embodiment places the file protect device directly adjacent base 15 and does not involve any change to front edge 160 of shell 17. The operation of this embodiment is essentially the same as that of the embodiment of FIG. 4, with appropriate modification to sensing circuitry 110 to account for the different location of the write protect device. A switch is considered "on" for this embodiment when it detects tab 145, or in the case of a previously used cartridge in a new drive, when it detects front face 18. A switch is considered "off" for this embodiment when it detects its half of recess 135 or the lack of a tape cartridge in the drive.

In a further variation on this embodiment, as shown in FIG. 3, the file protect device is not slide switch 120 but a rotatable plug 180, which may be essentially the same as that of some present full-sized data cartridges. The rotatable plug is located towards the center of the front face of the cartridge, as shown. A recess 100 is used, and in this embodiment it preferably extends to the side wall such that portion 150 of the front wall is not present. This provides a location that a first switch in a suitably adapted drive may sense to determine whether the cartridge is of the present invention. A second switch determines file protection, and operates the same as the counterpart switch in present drives, but is adapted or moved to sense the location of the rotatable plug 180. Top part 190 of rotatable plug 180 is accessible through hole 170 in the top of cartridge shell 17 to allow the cartridge user to position plug 180 as required.

Figure 6:
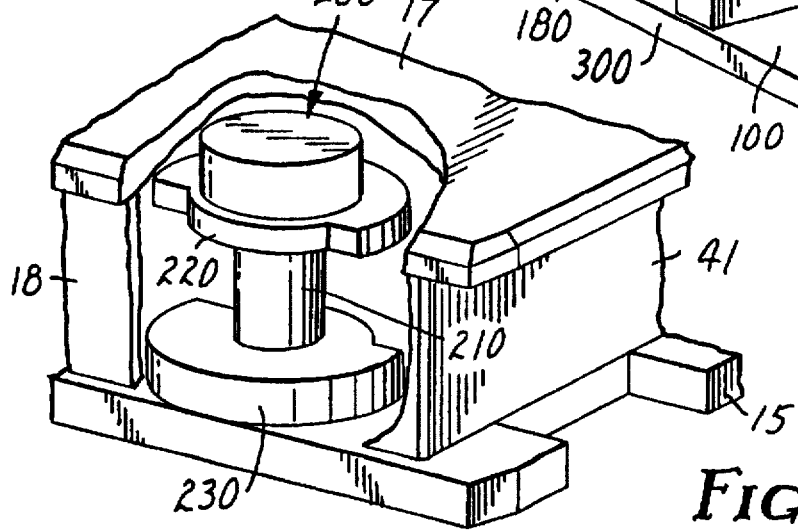
FIG. 6 is a perspective view of a portion of another embodiment of the invention.

FIG. 6 shows another embodiment of a file protect device, a rotatable plug 200 comprising shaft 210, two differently configured flanges 220 and 230 on opposite ends of shaft 210, and top cap 240. Rotatable plug 200 is sized to replace the rotatable plug employed in the file protect device of a non-inventive full-sized tape cartridge. The diameter of shaft 210 is sufficiently narrow that the file protect switch in present tape drives will interpret the inventive tape cartridge as an existing tape cartridge in write protect position, regardless of the rotation of rotatable plug 200.

Flanges 220 and 230 each comprise two oppositely directed semicircular portions of unequal radii. Each semicircular portion of each flange has a larger radius than that of shaft 210. The radius of the largest semicircular portion is just that of the write protect plug of a non-inventive tape cartridge. Flanges 220 and 230 are oppositely rotated relative to each other on shaft 210, defining first and second positions of rotatable plug 200 according to which indicator presents its largest radius portion in a given direction. Slotted top cap 240 extends above the top of cartridge shell 17 through a suitable sized hole 170 so that the tape cartridge user may change rotatable plug 200 from first to second position or vice versa.

A tape drive adapted for use with tape cartridges of this embodiment has means for detecting flanges 220 and 230, which as before may be taken to be mechanical switches for the purposes of illustration. Taking switch "A" to detect flange 220 and switch "B" to detect flange 230, the switch logic for the drive is the same as that for the embodiment of FIG. 2 as given above. A switch is considered "on" for this embodiment when it detects the larger semicircular portion of a flange; or in the case of an old cartridge in a new drive, when it detects the rotatable plug of the non-inventive cartridge. A switch is considered "off" when it detects the smaller semicircular portion of a flange or the lack of a tape cartridge in the drive.

In any of the embodiments described above, the presence of a cartridge (non-inventive or inventive) can be inferred by the positions of the two switches. For example, it is clear from the logic table for a two-switch drive (above) that if either switch is on, the drive may infer that a cartridge is present. However, for improved reliability and compatibility with presently used drive logic, a cartridge should positively indicate to a new drive that it is present in the drive. This is done by reserving a portion of the inventive cartridge from any changes otherwise necessary. The reserved portion then comprises a means for indicating to the drive that any cartridge is present.

For example, the embodiment of FIG. 3 may be used with a tape drive having three switches, the third switch being used to determine positively that a cartridge of any type is present. As before, the other two switches determine if the cartridge is of the previously used or inventive type, and whether the data is write protected. In the embodiment of FIG. 3, a preferred position for the third switch sensing area is along the edge face 300 of base 15. For drives adapted for "front loading" of the cartridge into the drive, as shown in FIG. 1, the portion of the edge face 300 shown in FIG. 3, i.e., in the vicinity of the other two switch sense positions, is preferred. However, some drives are designed for "edge loading," in which case the cartridge is inserted such that one of the opposed edge walls 41 is inserted into the drive first. In these designs, a preferred position for the third switch sensing area is either along the edge face of the base 15, or along the adjacent edge wall 41, on the same side as that inserted into the drive first. The third switch is considered "on" when it detects the edge face 300, and "off" when it detects the absence of the cartridge. The drive logic may then be modified such that the third switch must be "on" before any read or write operation is performed.

A further embodiment of the inventive cartridge is suitable for use in a new drive which employs four switches. One switch determines if a cartridge is present in the drive at all. Another switch determines the type of cartridge present, previously used or inventive. The drive logic then ignores the switch which would be used with the type of cartridge which is not present. Then the switch which is used with the type of cartridge present determines write protection of the cartridge, as described above.

In the embodiment shown in FIG. 3, preferred positions for the sense locations for the four switches are as follows. The switch which determines whether a cartridge is present at all may sense the edge face 300 along either the front or side of the, cartridge. For the switch which determines which type of cartridge is present, the preferred area is the sidemost portion of the recess 100, i.e., in the position where the front wall portion 150 (see FIG. 3) is present in a previously used cartridge. As will be apparent from the drawing, this sidemost portion of the opening 100 also can be detected by a drive sensor positioned either at the front or the side of the cartridge. For the switch which determines write protection for the inventive cartridge, the preferred position is the location of rotatable plug 180 as shown in FIG. 3. For the switch which determines write protection for a previously used cartridge, the preferred area is the other portion of the recess 100, as that is the location of the file protect device in presently used cartridges.

The switch logic is as shown below. Switch "C" determines whether a cartridge is present, switch "D" determines the type of cartridge, switches "E" and "F" determine file protection for inventive ("New") and previously used ("Old") cartridges, respectively, as described above. Blank entries in the table indicate that the switch may be ignored.

| | Switch | | | | |
|---|---|---|---|---|---|
| Configuration | C | D | E | F | Result |
| No Cartridge | Off | — | — | — | — |
| New Cartridge | On | Off | Off | — | Write Prohibited |
| New Cartridge | On | Off | On | — | Write Permitted |
| Old Cartridge | On | On | — | Off | Write Prohibited |
| Old Cartridge | On | On | — | On | Write Permitted |

We claim:

1. A data tape cartridge having a front and a side, and having a plurality of indicator openings formed therein the presence or absence of which would be detectable by sensors in a tape drive for the data tape cartridge upon placement of the data tape cartridge in a suitable tape drive and which would indicate information about the tape cartridge to the tape drive, wherein said plurality of indicator openings comprises:

a. a first indicator opening in an industry standard location indicating that data tape cartridges of a certain nature are write-protected, said first indicator opening being permanently open;

b. a second indicator opening indicating the nature of the tape in the data tape cartridge, said second indicator opening extending around a corner from the front to the side of the data tape cartridge such that a tape drive sensor positioned on either said front or said side of said data tape cartridge could detect said second indicator opening.

2. The data tape cartridge of claim 1, wherein there is no boundary between said first and second indicator openings, so that together they form a single elongate opening.

3. The data tape cartridge of claim 1, further comprising a third indicator opening having a movable member mounted substantially therein and selectively movable between a position closing said third indicator opening and a position leaving said third indicator opening open.

4. The data tape cartridge of claim 3, wherein said movable member comprises a rotatably mounted half-cylinder having a curved side and a flat side, said half-cylinder being positioned substantially in said third indicator opening such that when said half-cylinder is rotated into a first position said curved side of said half-cylinder blocks said third indicator opening, and when said half-cylinder is rotated into a second position, said flat side of said half-cylinder is spaced from the side of the data tape cartridge far enough that said third indicator opening would appear open to a tape drive sensor.

* * * * *